US012683785B2

(12) United States Patent
Gean et al.

(10) Patent No.: US 12,683,785 B2
(45) Date of Patent: Jul. 14, 2026

(54) SYSTEMS AND METHODS FOR IDENTITY VERIFICATION USING IDENTITY TOKENS

(71) Applicant: JPMORGAN CHASE BANK, N.A., New York, NY (US)

(72) Inventors: Gerardo Gean, Plano, TX (US); Raghu Vudathu, Downingtown, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 139 days.

(21) Appl. No.: 18/498,884

(22) Filed: Oct. 31, 2023

(65) Prior Publication Data

US 2025/0141685 A1 May 1, 2025

(51) Int. Cl.
| | |
|---|---|
| *H04L 9/32* | (2006.01) |
| *G06Q 20/38* | (2012.01) |
| *G06Q 20/40* | (2012.01) |

(52) U.S. Cl.
CPC ......... *H04L 9/3213* (2013.01); *G06Q 20/382* (2013.01); *G06Q 20/4014* (2013.01)

(58) Field of Classification Search
None
See application file for complete search history.

(56) References Cited

U.S. PATENT DOCUMENTS

| | | | | |
|---|---|---|---|---|
| 9,652,769 | B1 * | 5/2017 | Golin | ............... G06Q 20/38215 |
| 2017/0251025 | A1 | 8/2017 | Varley et al. | |

| | | | | |
|---|---|---|---|---|
| 2020/0004946 | A1 * | 1/2020 | Gilpin | ....................... H04L 9/50 |
| 2022/0101309 | A1 | 3/2022 | Eirinberg et al. | |
| 2024/0170113 | A1 * | 5/2024 | Schneider | ............... G06F 21/64 |

OTHER PUBLICATIONS

International Search Report Written Opinion of the International Searching Authority, dated Jan. 31, 2025, from corresponding International Application No. PCT/US2024/052577.

* cited by examiner

*Primary Examiner* — Cai Y Chen
(74) *Attorney, Agent, or Firm* — GREENBERG TRAURIG LLP

(57) ABSTRACT

Systems and methods for identity verification using identity tokens are disclosed. In one embodiment, a method for throttled sharing of personal information may include: (1) receiving, by a personal identity verification computer program and from a third party system for a third party, an identity token for a customer, wherein the third party system received the identity token from a customer electronic device; (2) retrieving, by the personal identity verification computer program, customer personal information for the customer associated with the identity token; (3) retrieving, by the personal identity verification computer program, third party identity verification requirements for the third party; (4) confirming, by the personal identity verification computer program, that the customer personal information meets the third party identity verification requirements; and (5) returning, a result of the confirmation to the third party system.

20 Claims, 3 Drawing Sheets

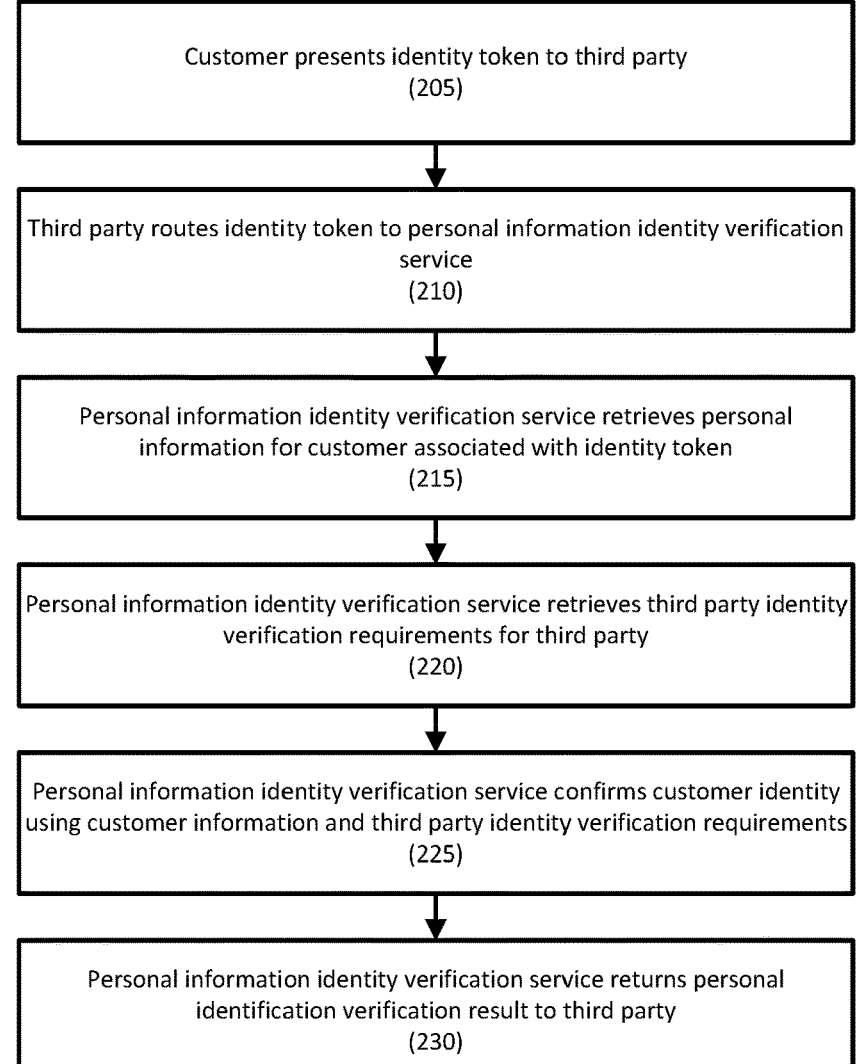

Customer presents identity token to third party
(205)

Third party routes identity token to personal information identity verification service
(210)

Personal information identity verification service retrieves personal information for customer associated with identity token
(215)

Personal information identity verification service retrieves third party identity verification requirements for third party
(220)

Personal information identity verification service confirms customer identity using customer information and third party identity verification requirements
(225)

Personal information identity verification service returns personal identification verification result to third party
(230)

FIGURE 2

SYSTEMS AND METHODS FOR IDENTITY VERIFICATION USING IDENTITY TOKENS

BACKGROUND OF THE INVENTION

1. Field of the Invention

Embodiments generally relate to systems and methods for identity verification using identity tokens.

2. Description of the Related Art

Customers often need to prove who they are before engaging in an activity. For example, a customer may need to present a driver license, a membership card, etc. before making a purchase, being provided with services, accessing a building or other area, etc. Fake driver licenses and other identification/membership cards can be manufactured, leading to fraudulent activity.

SUMMARY OF THE INVENTION

Systems and methods for identity verification using identity tokens are disclosed. In one embodiment, a method for throttled sharing of personal information may include: (1) receiving, by a personal identity verification computer program and from a third party system for a third party, an identity token for a customer, wherein the third party system received the identity token from a customer electronic device; (2) retrieving, by the personal identity verification computer program, customer personal information for the customer associated with the identity token; (3) retrieving, by the personal identity verification computer program, third party identity verification requirements for the third party; (4) confirming, by the personal identity verification computer program, that the customer personal information meets the third party identity verification requirements; and (5) returning, a result of the confirmation to the third party system.

In one embodiment, the identity token may expire after a period of time, after a number of uses, etc.

In one embodiment, the third party identity verification requirements may include a customer and/or a customer membership status.

In one embodiment, wherein the result may include a Boolean response.

In one embodiment, the customer personal information may include a first name and a last name, a license number, a customer age, a customer date of birth, and/or a customer membership status.

In one embodiment, the identity token may be issued by an identity provider, the customer personal information may be received during customer onboarding with the identity provider, and the identity token may be mapped to the customer personal information.

According to another embodiment, a system may include: an identity provider comprising a digital identity issuing computer program and a personal identity verification computer program; a customer electronic device associated with a customer; and a third party system for a third party. The digital identity issuing computer program may be configured to receive customer personal information from the customer and to issue an identity token to the customer based on the customer personal information. The customer electronic device may be configured to store the identity token and to provide the identity token to the third party system as part of a transaction. The personal identity verification computer program may be configured to receive the identity token from the third party system, to retrieve the customer personal information for the customer associated with the identity token, to retrieve third party identity verification requirements for the third party, to confirm that the customer personal information meets the third party identity verification requirements, and to return a result of the confirmation to the third party system.

In one embodiment, the identity token may expire after a period of time, after a number of uses, etc.

In one embodiment, the third party identity verification requirements may include a customer and/or a customer membership status.

In one embodiment, the result may include a Boolean response.

In one embodiment, the customer personal information may include first name and a last name, a license number, a customer age, a customer date of birth, and/or a customer membership status.

In one embodiment, the digital identity issuing computer program may be configured to receive the customer personal information from the customer during customer onboarding with the identity provider, and to map the identity token to the customer personal information.

According to another embodiment, a non-transitory computer readable storage medium may include instructions stored thereon, which when read and executed by one or more computer processors, cause the one or more computer processors to perform steps comprising: receiving, from a third party system for a third party, an identity token for a customer that was received from a customer electronic device, wherein the identity token may be issued by an identity provider and may be associated with customer personal information that was received during customer onboarding with the identity provider, and the identity token may be mapped to the customer personal information; retrieving the customer personal information for the customer associated with the identity token; retrieving third party identity verification requirements for the third party; confirming that the customer personal information meets the third party identity verification requirements; and returning a result of the confirmation to the third party system.

In one embodiment, the identity token may expire after a period of time, after a number of uses, etc.

In one embodiment, the third party identity verification requirements may include a customer and/or a customer membership status.

In one embodiment, the result may include a Boolean response.

In one embodiment, the customer personal information may include a first name and a last name, a license number, a customer age, a customer date of birth, and/or a customer membership status.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

FIG. 2 depicts a method for identity verification using identity tokens according to an embodiment;

DETAILED DESCRIPTION OF PREFERRED EMBODIMENTS

Embodiments are directed to systems and methods for identity verification using identity tokens.

Figure 1:
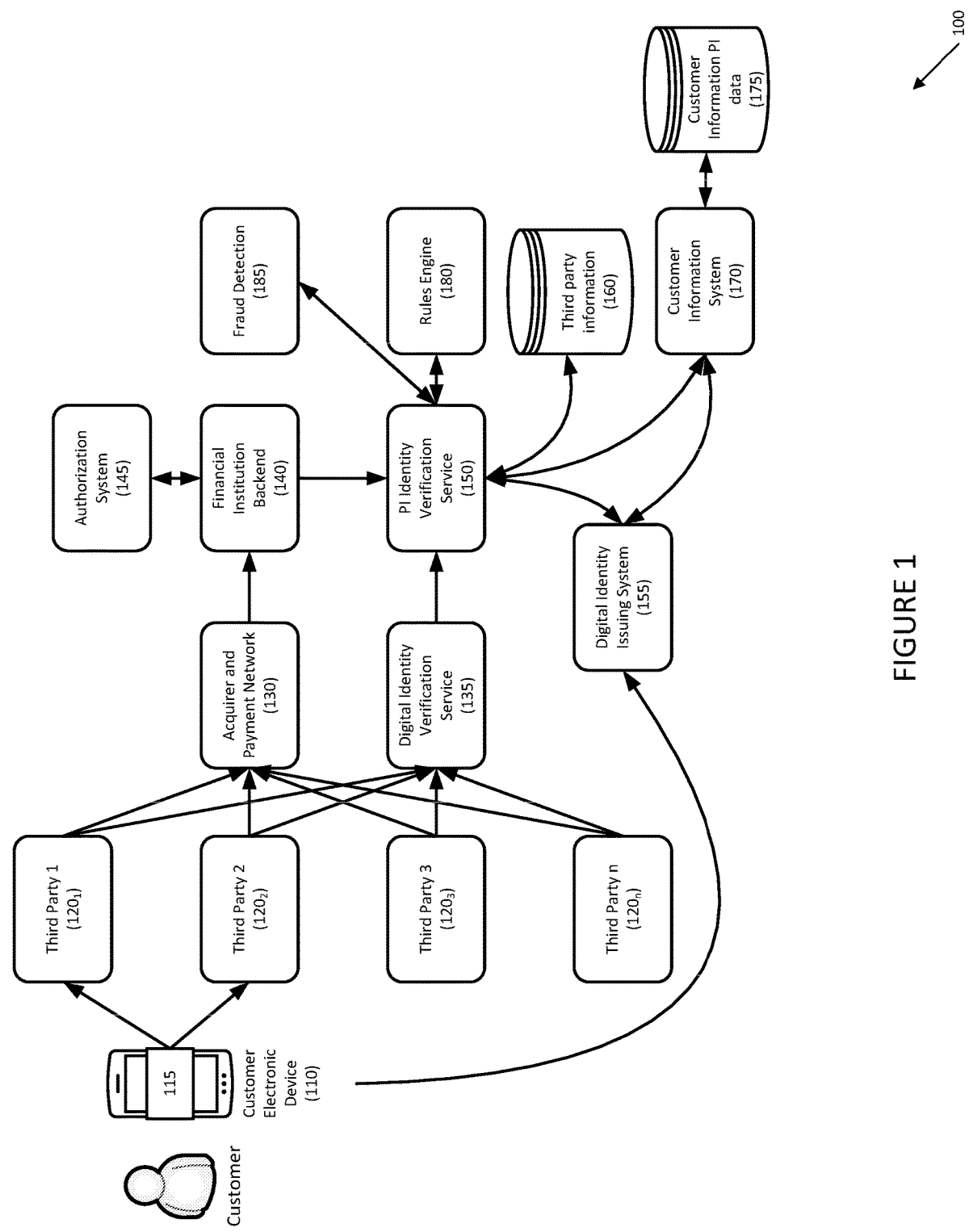
FIG. 1 depicts a system for identity verification using identity tokens according to an embodiment.

Referring to FIG. 1, a system for identity verification using identity tokens is provided according to an embodiment. System 100 may include a customer that may operate customer electronic device 110. Customer electronic device 110 may be provisioned with token 115 in a digital wallet (not shown), and may present identity token 115 to third party 120 (e.g., third party 1 $120_1$, third party 2 $120_2$, third party 3 $120_3$, . . . third party n $120_n$). Third party 120 may be a merchant, such as a good or service provider, a club with membership, a venue, building, or area with access restrictions, etc.

Third party 120 may interface with acquirer and payment network 130 if, for example, the interaction between the customer and the third party is a purchase. Acquirer and payment network 130 may submit a personal information verification request including identity token 115 and any transaction details to financial institution backend 140, which may provide the request to authorization system 145 for payment authorization system.

Financial institution backend 140 may also request any third party information to personal identification verification service 150. Personal identification verification service 150 may retrieve customer information associated with identity token 115 from customer personal information database 175 via customer information system 170. Customer information database 175 may be populated with customer personal information during customer enrollment or onboarding.

Digital identity issuing system 155 may issue identity token 115 to customer electronic device 110 as required.

Personal identification verification service 150 may also retrieve third party information from third party information database 160. In one embodiment, the third party information may be received during third party onboarding, and may identify the third party, any personal information identification requirements, etc.

For interactions between the customer and third party 120 that are not a transaction, such as personal information verification, membership verification, status verification, etc., third party 120 may provide identity token 115 to digital identity verification service 135, which may route identity token 115 to personal identification verification service 150.

Personal identification verification service 150 may further interface with fraud detection 185, which may assess the request from third party 120 to determine if the request is fraudulent. Examples of fraud may be based on the location of the transaction, a lack of merchant credibility (e.g., a new merchant that was just onboarded and does not have any history), issues with the customer device (e.g., the customer electronic device may be a black listed device due to past history with the customer or a prior user), etc.

Personal identification verification service 150 may use rules engine 180 to apply rules to the personal identification verification request. For example, the rules may be based on the merchant (e.g., a merchant may only share an identification validation with the customer name, may only share the customer name if the customer is above a certain age, may share the customer name and address, etc.

Referring to FIG. 2, a method for identity verification using identity tokens is disclosed according to an embodiment.

In step 205, using a customer electronic device, a customer may present an identity token to a third party. The identity token may be issued by a digital identity issuing system based on information for the customer received during customer enrolment or onboarding.

In one embodiment, the identity token may expire and may need to be refreshed periodically based on different conditions or criteria that may be configurable. For example, the conditions or criteria may be time based (e.g., the identity token may be valid for a certain duration, such as 30 days), may be based on a number of transactions (e.g., the identity token may be refreshed after a certain number of uses), may be refreshed after every transaction, etc. The conditions or criteria may be set by the customer, by the issuer or the identity token, and may be dynamic to respond to security threats, etc.

In one embodiment, the digital identity issuing system may be associated with a financial institution that may be required to have a certain level of verified information about the customer, such as Know Your Customer requirements.

In one embodiment, the third party may be a merchant (e.g., a provider of a good or service), a club with membership, a venue, building, or area with access restrictions, etc. The third party may or may not have a relationship with the financial institution. The financial institution may be required to have a certain level of verified information about the merchant such as Know The Merchant from a direct relationship, or via a third party service.

In step 210, the third party may route the identity token to a personal information identity verification service, and, in step 215, the personal information identity verification service may retrieve personal information for the customer that is associated with the identity token. In one embodiment, the customer information may be retrieved from a customer information database.

In step 220, the personal information identity verification service may also retrieve third party identity verification requirements for the third party. The third party identity verification requirements may specify the information the third party requires to be verified, such as a membership with the third party.

In step 225, the personal information identity verification service may confirm that the customer meets the third party identity verification requirements using the customer information.

In step 230, the personal information identity verification service may return a personal identification verification result to the third party. The result may be a Boolean result (e.g., yes/no, true/false, etc.), may provide membership information (e.g., member number), status information (e.g., platinum, gold, silver, etc.), and any other information as is necessary and/or desired.

In one embodiment, the response may also include personal information such as the customer's first name and last name, license number, customer address, customer age (not the date of birth), customer month and year of birth, etc. The response may be returned to the merchant backend system and not to the actual person interacting with the customer (for protection), which in turn would reply back to the employee of the merchant with a Boolean result in the merchant system.

Figure 3:
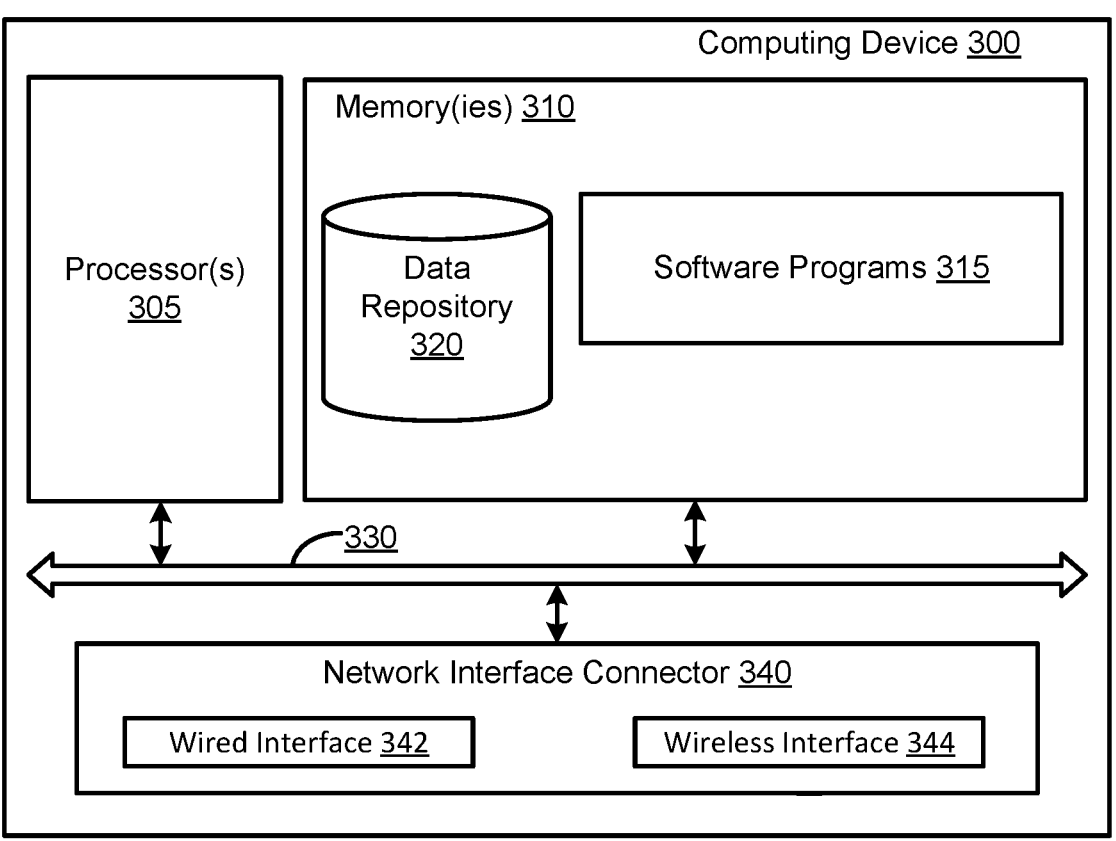
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for identity verification using identity tokens, comprising:

receiving, by a personal identity verification computer program and from a third party system for a third party, a request for personal identity verification comprising an identity token for a customer, wherein the third party system received the identity token from a customer electronic device, and wherein the identity token does not include or reference payment instrument information;

retrieving, by the personal identity verification computer program, customer personal information for the customer associated with the identity token;

retrieving, by the personal identity verification computer program, third party identity verification requirements for the third party;

confirming, by the personal identity verification computer program, that the customer personal information meets the third party identity verification requirements; and returning, a result of the confirmation to the third party system.

2. The method of claim 1, wherein the identity token expires after a period of time.

3. The method of claim 1, wherein the identity token expires after a number of uses.

4. The method of claim 1, wherein the third party identity verification requirements comprise a customer and/or a customer membership status.

5. The method of claim 1, wherein the result comprises a Boolean response.

6. The method of claim 1, wherein the customer personal information comprises a first name and a last name, a license number, a customer age, a customer date of birth, and/or a customer membership status.

7. The method of claim 1, wherein the identity token is issued by an identity provider, the customer personal information is received during customer onboarding with the identity provider, and the identity token is mapped to the customer personal information.

8. A system, comprising:

an identity provider comprising:

a digital identity issuing computer program; and a personal identity verification computer program;

a customer electronic device associated with a customer; and a third party system for a third party;

wherein:

the digital identity issuing computer program is configured to receive customer personal information from the customer and to issue an identity token to the customer based on the customer personal information, wherein the identity token does not include or reference payment instrument information;

the customer electronic device is configured to store the identity token and to provide the identity token to the third party system as part of a transaction;

the personal identity verification computer program is configured to receive a request for personal identity verification comprising the identity token from the third party system;

the personal identity verification computer program is configured to retrieve the customer personal information for the customer associated with the identity token;

the personal identity verification computer program is configured to retrieve third party identity verification requirements for the third party;

the personal identity verification computer program is configured to confirm that the customer personal information meets the third party identity verification requirements; and the personal identity verification computer program is configured to return a result of the confirmation to the third party system.

9. The system of claim 8, wherein the identity token expires after a period of time.

10. The system of claim 8, wherein the identity token expires after a number of uses.

11. The system of claim 8, wherein the third party identity verification requirements comprise a customer and/or a customer membership status.

12. The system of claim 8, wherein the result comprises a Boolean response.

13. The system of claim 8, wherein the customer personal information comprises a first name and a last name, a license number, a customer age, a customer date of birth, and/or a customer membership status.

14. The system of claim 8, wherein the digital identity issuing computer program is configured to receive the customer personal information from the customer during customer onboarding with the identity provider, and to map the identity token to the customer personal information.

15. A non-transitory computer readable storage medium, including instructions stored thereon, which when read and executed by one or more computer processors, cause the one or more computer processors to perform steps comprising:

receiving, from a third party system for a third party, a request for personal identity verification comprising an identity token for a customer that was received from a customer electronic device, wherein the identity token is issued by an identity provider and is associated with customer personal information that was received during customer onboarding with the identity provider, the identity token is mapped to the customer personal information, and the identity token does not include or reference payment instrument information;

retrieving the customer personal information for the customer associated with the identity token;

retrieving third party identity verification requirements for the third party;

confirming that the customer personal information meets the third party identity verification requirements; and returning a result of the confirmation to the third party system.

16. The non-transitory computer readable storage medium of claim 15, wherein the identity token expires after a period of time.

17. The non-transitory computer readable storage medium of claim 15, wherein the identity token expires after a number of uses.

18. The non-transitory computer readable storage medium of claim 15, wherein the third party identity verification requirements comprise a customer and/or a customer membership status.

19. The non-transitory computer readable storage medium of claim 15, wherein the result comprises a Boolean response.

20. The non-transitory computer readable storage medium of claim 15, wherein the customer personal information comprises a first name and a last name, a license number, a customer age, a customer date of birth, and/or a customer membership status.

\* \* \* \* \*